United States Patent [19]

Royneberg et al.

[11] Patent Number: 5,740,662
[45] Date of Patent: Apr. 21, 1998

[54] BALE WRAPPER APPARATUS

[75] Inventors: Erling Royneberg; Jahn Haugstad; Frode Underhaug; Trygve Tjermestad, all of Naerbo, Norway

[73] Assignee: Kverneland Underhaug A/s, Naerbo, Norway

[21] Appl. No.: 713,723

[22] PCT Filed: Jan. 28, 1994

[86] PCT No.: PCT/GB94/00176

§ 371 Date: Aug. 15, 1995

§ 102(e) Date: Aug. 15, 1995

[87] PCT Pub. No.: WO94/17653

PCT Pub. Date: Aug. 18, 1994

Related U.S. Application Data

[63] Continuation of Ser. No. 507,345, Aug. 15, 1995, abandoned.

[30] Foreign Application Priority Data

Feb. 15, 1993 [GB] United Kingdom ............ 9302996
Jun. 4, 1993 [GB] United Kingdom ............ 9311563

[51] Int. Cl.$^6$ ............................. B65B 53/00; B65B 11/04
[52] U.S. Cl. .......................... 53/556; 53/211; 53/587
[58] Field of Search .................. 53/556, 587, 588, 53/211, 215

[56] References Cited

U.S. PATENT DOCUMENTS

| 4,018,036 | 4/1977 | Cicci . | |
|---|---|---|---|
| 4,563,863 | 1/1986 | Humphrey | 53/587 X |
| 4,641,484 | 2/1987 | Popelka . | |
| 4,685,270 | 8/1987 | Brambilla . | |
| 4,934,131 | 6/1990 | Frisk et al. . | |
| 4,972,656 | 11/1990 | Haugstad . | |
| 5,129,215 | 7/1992 | Gratton | 53/211 X |
| 5,224,323 | 7/1993 | Fykse | 53/211 |

FOREIGN PATENT DOCUMENTS

| 77 25706 | 3/1979 | France . | |
|---|---|---|---|
| 2159489 | 12/1985 | United Kingdom | 53/587 |

Primary Examiner—Linda Johnson
Attorney, Agent, or Firm—Merchant, Gould, Smith, Edell, Welter & Schmidt

[57] ABSTRACT

A bale wrapper apparatus (10) which comprises: a frame (13); a towbar (14) attached to and projecting forwardly of the frame (13) to enable the apparatus to be towed behind a propelling vehicle (11); a arch structure (15) forming part of said frame (13) and facing in the intended direction of travel, said structure being of sufficient size to allow a bale (12) lying on the ground to pass through the arch (15) when the apparatus (10) is moved forwardly; a bale lifting device (16) mounted on the frame (13) and operative to lift a bale (12) lying on the ground to a bale-wrapping position; means (19) for rotating the bale (12) about a substantially horizontal axis (24) extending generally parallel to the direction of travel when the bale (12) has been lifted to the bale-wrapping position; means (20) for holding a supply reel (29) of stretchable plastics film for wrapping the bale (12); means (21) for causing relative rotation between the supply reel (29) and the bale (12) about a substantially vertical axis (22), while the bale (12) is being rotated about said substantially horizontal axis (24) whereby film can be withdrawn from the reel (29) to apply successive overlapping windings to the bale (12) in order to wrap the latter; and, means (16, 17, 19) operative to allow discharge of the wrapped bale rearwardly of the apparatus.

23 Claims, 12 Drawing Sheets

BALE WRAPPER APPARATUS

This is a File Wrapper Continuation application of the parent application Ser. No. 08/507,345, filed Aug. 15, 1995 now abandoned.

This invention relates to a bale wrapper apparatus, and is particularly, though not exclusively concerned with an apparatus for applying stretchable plastics film wrapping around a bale of agricultural crop material and which is of rectangular cross section.

The use of bale wrappers is now widespread in agriculture, in order to apply stretchable film wrapping around bales of crops such as straw, hay, grass and other long stem material, and to contain the crop in a substantially sealed manner so as to exclude atmospheric oxygen and water from coming into contact with the crop.

Wrapping of bales of newly or recently mown grass i.e. grass which still has a substantial proportion of water, is becoming a particularly popular way of forming silage, in that tightly wrapped bales of grass can mature or ferment to form silage within the wrapped bale in a relative short period of time (say two to three weeks), and without generation of silage effluent which is a serious drawback to the formation of silage in silage towers.

There are two main types of bale wrappers in use, namely the rotating turntable type and the orbiting "satellite" type of bale wrapper.

A rotating turntable type of bale wrapper comprises a turntable which is rotatable about a substantially vertical axis, a pair of laterally spaced rollers mounted on the turntable and which are operative to rotate a bale loaded onto the rollers about a substantially horizontal axis, and a mounting provided on the frame of the apparatus on which a supply reel of stretchable plastics film can be mounted, and from which film is withdrawn to be attached to the bale whereby, upon rotation of the bale about a horizontal axis under the action of the rollers, and simultaneous-rotation of the turntable about a substantially vertical axis, successive overlapping windings of film are applied around the outer periphery of the bale until such time as it has become completely covered, usually at least twice. Bale wrappers are usually employed to apply helical windings of stretched film around cylindrical or "round" bales, in which case the bale is supported on the rollers and is rotated about a substantially horizontal axis which comprises the longitudinal axis of the bale.

The other type of bale wrapper apparatus used to wrap cylindrical bales comprises the orbiting "satellite" type of bale wrapper, in which a pair of laterally spaced rollers are mounted on a table and which rotate the bale about its longitudinal axis similarly to that described above for the rotating turntable type of machine, but in this machine the table does not rotate about a vertical axis, and relative rotation about a substantially vertical axis takes place between the supply reel and the bale by virtue of the mounting of the supply reel on one end of a carrying arm which is rotatable at its inner end about a substantially vertical axis, and which carries the supply reel at its outer end and which thereby "orbits" around the bale mounted on the rollers of the table. The orbiting satellite type of bale wrapper has the advantage that the table does not rotate, and therefore the rotational inertia of the bale about the vertical axis does not have to be withstood by the components of the apparatus, and the component which rotates about the vertical axis i.e. the supply reel, is of small mass, and therefore the inertial forces generated are smaller. However, the supply reel is located at the end of the rotating arm which carries it, and from which it hangs, and therefore a substantial turning moment is applied to the mounting of the supply reel on the arm as the supply reel carries out its orbital path of movement around a circle of substantial radius.

Both the rotating turntable and the orbiting satellite type of bale wrapper apparatus have been designed primarily for use in the wrapping of cylindrical bales i.e. bales of circular cross section, in that the two horizontal spaced support rollers which rotate the bale about its axis (usually a substantially horizontal axis) are particularly suitable to rotate a cylindrical bale at a uniform rate of rotation and with the axis of the bale remaining at a substantially constant height above the rollers. Both of these factors contribute to uniform application of successive overlapping helical windings of film, which provides economic usage of film and necessary air/liquid type sealing of the crop within the wrapping.

Bale wrappers therefore have become very popular for use in wrapping cylindrical bales, which most farmers now make using one of two different types of "round" balers. However, the way in which the two types of round balers operate imposes limitations-on how densely packed can be the material within the cylindrical bale, and there is therefore growing interest in the possibility of returning to use of balers which make rectangular bales (which was the normal design shape of bales before the introduction of round balers), since bales of rectangular cross section can be packed to a much higher density of packing of the crop than is possible with cylindrical bales.

More densely packed bales have two advantages, the first of which is that transport and storage is made more efficient i.e. the weight per unit volume is higher than with cylindrical, bales, and also more efficient usage of stacking space can be achieved with rectangular section bales lying side by side than cylindrical bales standing side by side with inevitable voids therebetween, and the second advantage is that more densely packed grass has a lower proportion of air trapped within the bale, and therefore it is believed that improved quality of silage can be obtained within a wrapped rectangular bale, than within a wrapped cylindrical bale.

However, while it is widely recognised that rectangular bales have this advantage, and therefore there is a need to provide designs of bale wrapper which can carry out efficient substantially sealed wrapping of rectangular bales, and also with economical usage of film, to date no commercially acceptable designs have been produced.

The basic problems to solve are:

1. How to achieve substantially uniform rate of rotation of the bale about its longitudinal axis; and,
2. How to maintain this axis at a substantially constant height above the rollers on which the bale is supported.

Necessarily, a rectangular or square section bale, when supported and driven by a pair of horizontally spaced rollers, will carry out a "tumbling" type of motion which is part rotation at a variable angular speed, and also part oscillation up and down of the centre of gravity of the bale. These two factors mean that it is difficult to obtain uniform application of successive helical windings which overlap by about the same amount, and with risk of air gaps developing between adjacent edges of successive windings, which is clearly undesirable, both in the wrapping of crops which are to be maintained dry e.g. hay, and also in the wrapping of the crops which are required to ferment e.g. grass intended to mature or ferment to form silage.

The possibility of air gaps developing between the edges of successive windings could be overcome by increasing the "design" amount of overlap, but this causes consequent increase in, usage of film material which is not efficient from a cost point of view.

Various attempts have been made to try and maintain a substantially constant speed of angular rotation, and to minimise up and down oscillation of the centre of gravity of a rectangular bale, using additional guides, rollers and the like to control the rotation of the bale, but these are relatively unsophisticated and do not provide predictable and repeated cycles of operation, and therefore have not gained general acceptance.

A further problem with most existing designs of bale wrapper (when used to wrap bales which have been deposited in rows in a field) is that the bale wrapper has to be manoeuvred alongside each bale and then usually a bale-loading arm or other loading device mounted on the bale wrapper is operated in order to:

1. Engage the bale;
2. Lift it off the ground;
3. Transfer it onto a bale-receiving platform of the bale wrapper e.g. a pair of laterally spaced rollers mounted on a table; and,
4. Then return to its original position. Bale wrapping then takes place, following by discharge of the wrapped bale onto the ground.

Most existing designs of bale wrapper are only able to carry out the wrapping operation while the apparatus is stationary, and forward movement of the tractor and trailed bale wrapper combination to the next bale in a row only takes place after discharge of the wrapped bale.

Accordingly, the invention seeks to provide a bale wrapper apparatus which is able to carry out improved wrapping of bales e.g. of rectangular and square cross section, and also circular cross section, and to provide improved handling of bales (of rectangular or other cross section e.g. circular) in the matter of improvements in:

1. Engagement of a bale lying on the ground;
2. Lifting of the bale so that bale wrapping can take place; and,
3. Discharge of the wrapped bale so that:
   if required, some or all of these stages can take place while the bale wrapper is moving.

According to a first aspect of the invention there is provided a mobile bale wrapper apparatus which is capable of engaging a bale lying on the ground in the path of travel X of the apparatus and which is operative (1) to pick-up the bale, (2) to wrap the bale with stretchable plastics film wrapping and (3) to discharge the wrapped bale from the apparatus, and which comprises:

a frame;

a bale-lifting cradle mounted on the frame and operative to lift a bale lying on the ground to a bale-wrapping wrapping position, said cradle comprising a pair of elongate lifting devices laterally spaced apart from each other with respect to the path of travel X and engageable with opposed sides of the bale to lift the bale to the bale-wrapping position;

means for rotating the bale about a substantially horizontal axis extending generally parallel to the path of travel X when the bale has been lifted to the bale-wrapping position;

means for holding a supply reel of stretchable plastics film for wrapping the bale;

means for causing relative angular movement between the supply reel and the bale about at least one substantially vertical axis, while the bale is being rotated about said substantially horizontal axis, whereby film can be withdrawn from the reel to apply successive overlapping windings to the bale in order to wrap the latter; and, means operative to discharge the wrapped bale from the apparatus:

in which the cradle and the frame are arranged in such a way that: (1) a bale lying on the ground can be received by the cradle and then lifted to the bale-wrapping position, (2) can then be rotated about said substantially horizontal axis extending parallel to the path of travel X, and (3) finally can be rearwardly discharged from the apparatus after wrapping of the bale has been completed; all of this being able to be carried out as the apparatus is moved along its path of travel X, and without obstruction by the frame.

According to a second aspect of the invention there is provided a mobile bale wrapper apparatus which comprises:

a frame;

coupling means attached to the frame and operative to couple the apparatus in laterally off-set manner to a propelling vehicle whereby the propelling vehicle can run alongside a line of bales lying on the ground while the apparatus moves along its laterally off-set path of travel in which (1) it can pick-up each bale in turn, (2) wrap the bale with stretchable plastics film wrapping and (3) discharge the wrapped bale from the apparatus;

a bale-lifting cradle mounted on the frame and operative to lift a bale lying on the ground to a bale-wrapping position, said cradle comprising a pair of elongate lifting devices laterally spaced apart from each other with respect to the path of travel and engageable with opposed sides of the bale to lift the bale to the bale-wrapping position;

means for rotating the bale about a substantially horizontal axis extending generally parallel to the path of travel when the bale has been lifted to the bale-wrapping position;

means for holding a supply reel of stretchable plastics film for wrapping the bale;

means for causing relative angular movement between the supply reel and the bale about at least one substantially vertical axis, while the bale is being rotated about said substantially horizontal axis, whereby film can be withdrawn from the reel to apply successive overlapping windings to the bale in order to wrap the latter; and means operative to discharge the wrapped bale from the apparatus.

According to a third aspect of the invention there is provided a bale wrapper apparatus for applying stretchable plastics film windings around a bale of rectangular cross section in order to wrap the bale, in which the apparatus comprises:

a frame;

a towbar attached to and projecting forwardly of the frame to enable the apparatus to be towed behind a propelling vehicle;

an arch structure forming part of said frame and facing in the intended direction of travel, said structure being of sufficient size to allow a bale lying on the ground to pass through the arch when the apparatus is moved forwardly;

a bale lifting cradle mounted on the frame and operative to lift a bale lying on the ground to a bale-wrapping position;

means for rotating the bale about a substantially horizontal axis extending generally parallel to the direction of travel when the bale has been lifted to the bale wrapping position;

a rotatable arm adapted to carry a supply reel of stretchable plastics film and mounted on the frame to rotate about a substantially vertical axis and thereby cause the reel to carry out a circular orbit around the bale while the latter is rotated about the substantially horizontal axis and thereby apply overlapping windings of film around the outer surface of the bale;

in which the bale-lifting cradle comprises:

a pair of lifting assemblies mounted on the frame at laterally spaced apart positions to allow the rectangular cross section bale to be received therebetween with two opposed sides of the bale extending substantially vertically;

a pair of rollers rotatably mounted in each assembly and extending in a direction parallel to the direction of travel and defining a clear entry path for the bale to be received between the rollers of the two assemblies;

pivotable mountings supporting each assembly and allowing each assembly to occupy an engaging position in which the rollers of each assembly are located one above the other and able to engage the adjacent side of the bale, and when drive is applied to the rollers to cause the bale to be lifted from the ground under frictional contact with the sides of the bale and then take-up a bale-wrapping position, and said assemblies also being able to take-up a bale supporting and driving position in which the rollers of each assembly are located side by side and supporting the underside of the bale and being operative when drive is applied to all of the rollers to cause the bale to rotate about said substantially horizontal axis extending parallel to the direction of travel and thereby form said bale rotating means; and, means for laterally separating the assemblies from the bale when wrapping has been completed, whereby the wrapped bale can fall under gravity onto the ground and then be discharged rearwardly relative to the apparatus when the latter is moved forwardly by the propelling vehicle.

Apparatus according to the invention may be used therefore to carry out the stages of engaging, lifting, wrapping and rearward discharge of the bale while the apparatus is being moved towards a next bale which is to be wrapped, and which makes the operation of wrapping bales deposited in a field take much less time compared with existing bale wrappers which usually carry out bale wrapping while-stationary.

The bale wrapper apparatus is therefore able to function as a through-flow handling and wrapping device for a bale lying on the ground, and can carry out continuous, or intermittent forward motion along a line of bales to be wrapped while these operations are being carried out.

Various preferred aspects of the bale wrapper apparatus according to the first, second or third aspects of the invention will now be described.

A towbar may be arranged so that it can be coupled to the rear of the propelling vehicle e.g. a tractor in such a way that the apparatus is laterally off-set relative to the tractor (for bale handling operations) so that the tractor can be driven alongside a row of bales deposited in a field and the apparatus can easily be lined-up with the bales and can carry out at least some of the stages referred to above "on the move". This is particularly suitable for handling bales of rectangular cross section, which are usually discharged rearwardly of the baler with a longitudinal axis of the bale extending parallel to the direction of forward travel.

An arch structure of the frame may be arranged at the front of the apparatus, whereby each bale on the ground first passes through the arch structure before engagement, lifting and wrapping takes place, or it may be arranged at the rear of the apparatus, whereby the rearward discharge of the wrapped bale takes place through the arch structure. Other locations of the arch structure may be provided, if desired, intermediate the front and rear of the apparatus.

Preferably, in the apparatus according to the invention, relative angular rotation between the supply reel and the bale is achieved by mounting the supply reel on an arm which is rotatably mounted on the frame to rotate about at least one substantially vertical axis whereby the supply reel is able to carry out a closed loop or path around the bald.

More than one supply reel may be mounted on the apparatus according to the invention e.g. two arms rotatable about the same axis, or a single long arm rotatable about its mid point and adapted to carry a supply reel at each end.

In the apparatus according to the invention, the lifting device or cradle may comprise a pair of lifting arrangements laterally spaced from each other to allow a bale to be received therebetween, and each operative to engage at least an adjacent side and/or underside of the bale and to lift the bale to the bale-wrapping position.

In its simplest form, each lifting arrangement may have a single roller, or other suitable elongate lifting device, to be located at each side of the bale, and which rollers can be moved relatively towards each other to engage the respective bale sides and then lift the bale upon upward movement of the rollers, and which thereafter can be operated in order to apply a tumbling rotary action to the bale to rotate the latter about a generally horizontal axis while film wrapping takes place.

However, in one preferred embodiment, each lifting arrangement may comprise an assembly of two rollers, which extend generally parallel to the direction of travel and which can be driven in order to lift the bale by frictional contact between the rollers and the bale sides.

Each roller assembly is preferably capable of taking-up a bale-engaging position in which the rollers are arranged one above the other (which is particularly suitable for use in lifting a rectangular cross section bale), so that the rollers engage the adjacent substantially vertical bale sides and lift the bale to the wrapping position.

Preferably, each roller assembly is pivotable from the bale-engaging position to a bale driving i.e. rotating position, in which the rollers move to a position at approximately the same level, in which they support the lower side of the bale.

The rollers of the two lifting assemblies can then be driven in the same direction in order to impart rotation to the bale about a substantially horizontal axis. The arrangement of the rollers can be made such that a substantially uniform rate of rotation is applied to the bale, and also the axis about which it rotates remains at generally the same height above the rollers.

The rotational axis may move a certain amount, both up and down, and also laterally, bearing in mind that a rectangular bale has four sides joined together via right angles at each corner, but it has been found that the roller assembly may be arranged such that the vertical and lateral oscillation of the centre of gravity of the bale can be kept within reasonable limits, and with a substantially constant rate of rotation about this axis, whereby predictable overlap of successive windings of film can be achieved which are applied to the outer surface of the bale to provide satisfactory and substantially sealed wrapping of the bale contents, and economical usage of film.

In a preferred arrangement of the roller assemblies of the cradle, a lifting device is provided and which also forms means for rotating the bale about the substantially horizontal axis.

The lifting cradle is particularly suitable for use in handling rectangular section bales, but may also be used to handle bales of other shapes such as cylindrical bales.

In order to provide for lateral adjustment of the separation between the two lifting assemblies of the cradle, to suit different transverse dimensions of bales to be received therebetween e.g. bales of different widths or diameters, it is preferred that at least one of the assemblies is carried by a support arm pivotally mounted on the frame e.g. on the arch structure and adjustable under action of a ram or the like.

To automate clamping and cutting of the film length running between the supply reel and the bale after wrapping has been completed, and prior to rearward discharge of the wrapped bale, a clamp/cutting device may be provided, which can be operated automatically, or manually under driver control in-order to:

1. Gather the length of film running between the reel and wrapped bale to form a "string" of film;
2. Clamp the gathered film;
3. Cut the film between the clamp and the wrapped bale; and,
4. Hold the cut end after the wrapped bale has been discharged ready for a further cycle of operation.

Preferred embodiments of bale wrapper apparatus will now be described in detail, by way of example only, with reference to the accompanying drawings, in which.

Figure 14:
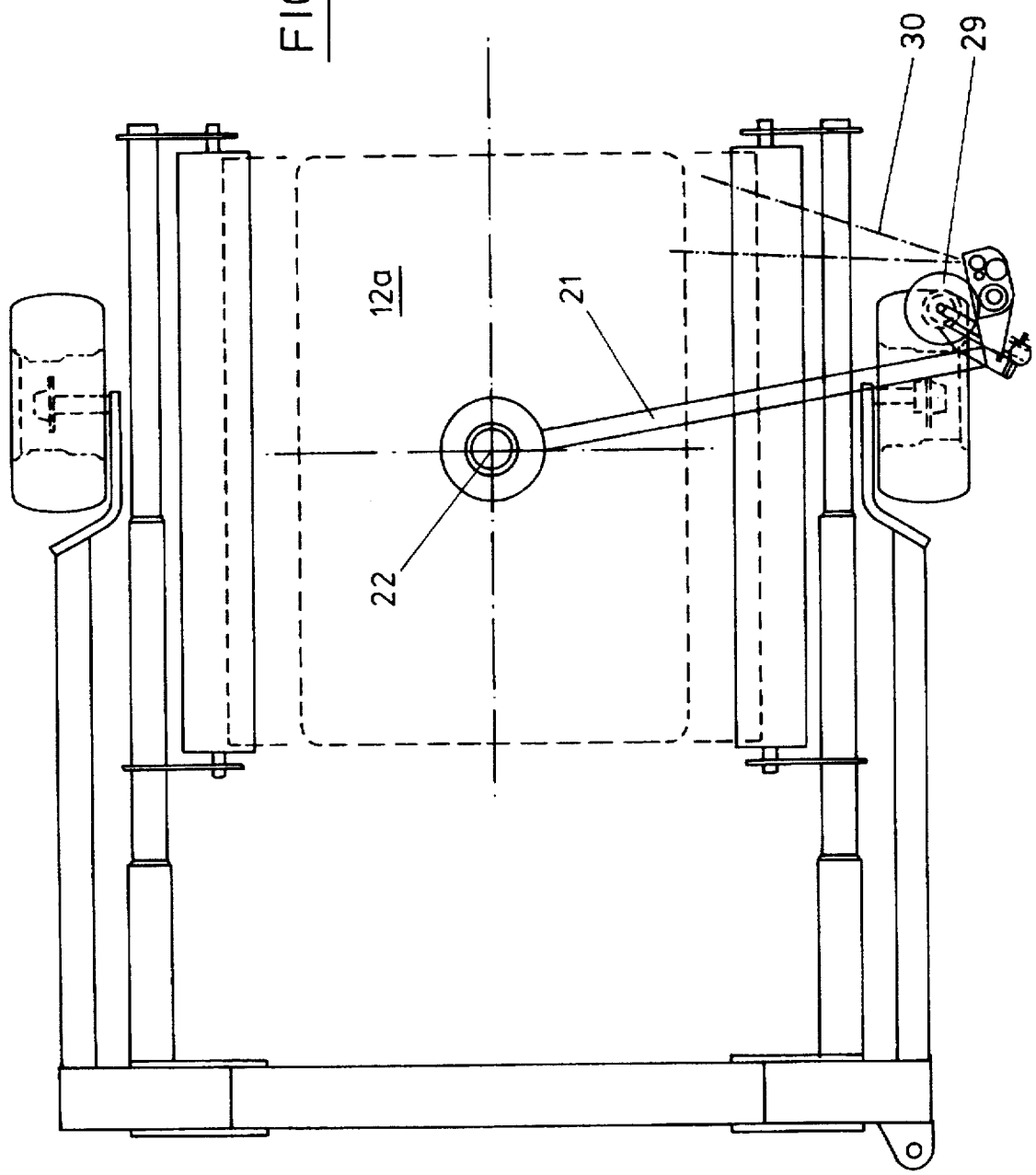
Figure 15:
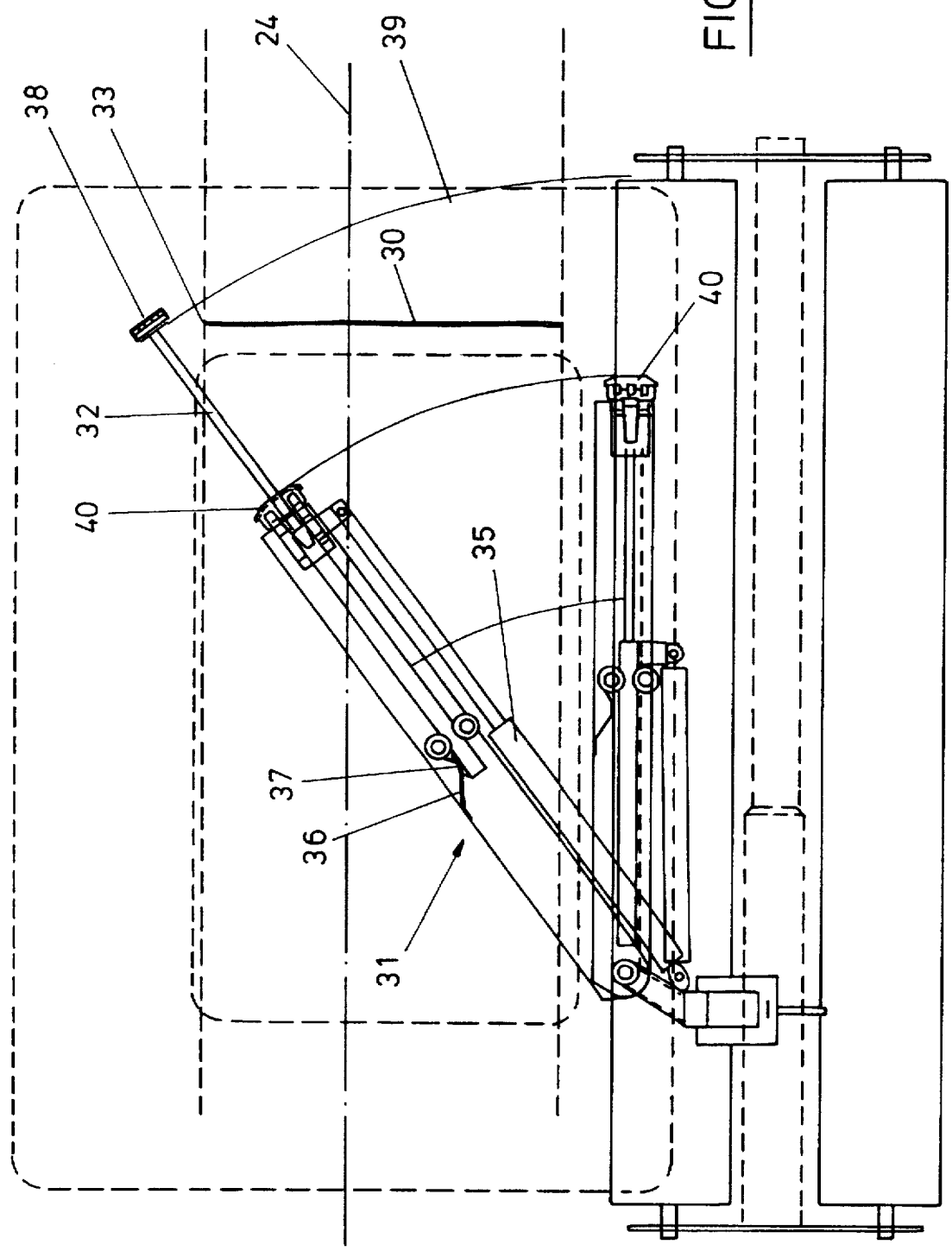

FIG. 14 is a plan view of this further embodiment showing final position taken-up by a film supply reel at the completion of bale wrapping operation; and, FIG. 15 is a detailed side view of an automatically operating clamp and cut mechanism for use in clamping and then cutting the length of film running between the supply reel and the wrapped bale, prior to rearward discharge of the wrapped bale from the apparatus.

Figure 1:
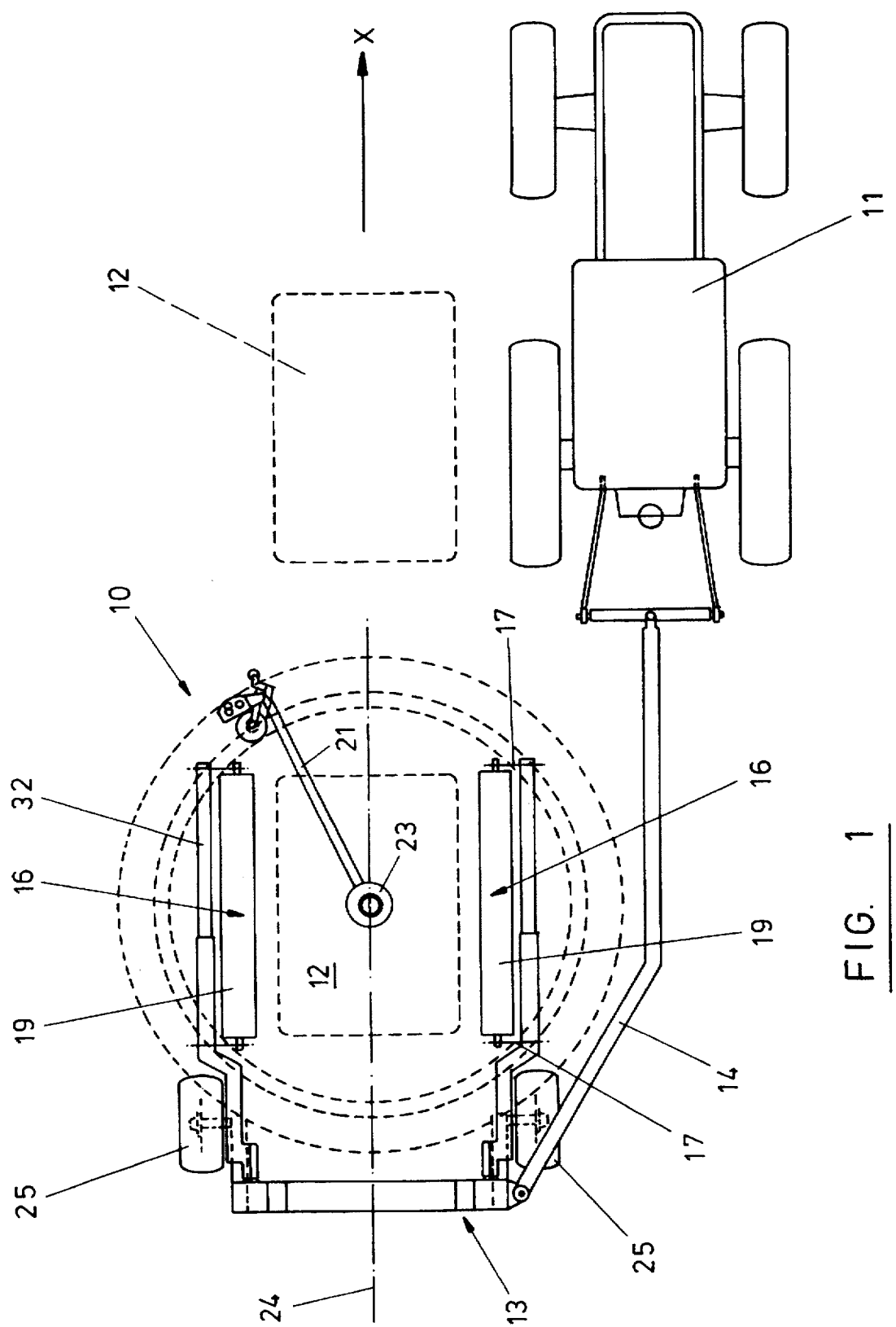
FIG. 1 is a plan view of a first embodiment of bale wrapper apparatus according to the invention, showing it occupying an off-set position towed behind a tractor.
Figure 2:
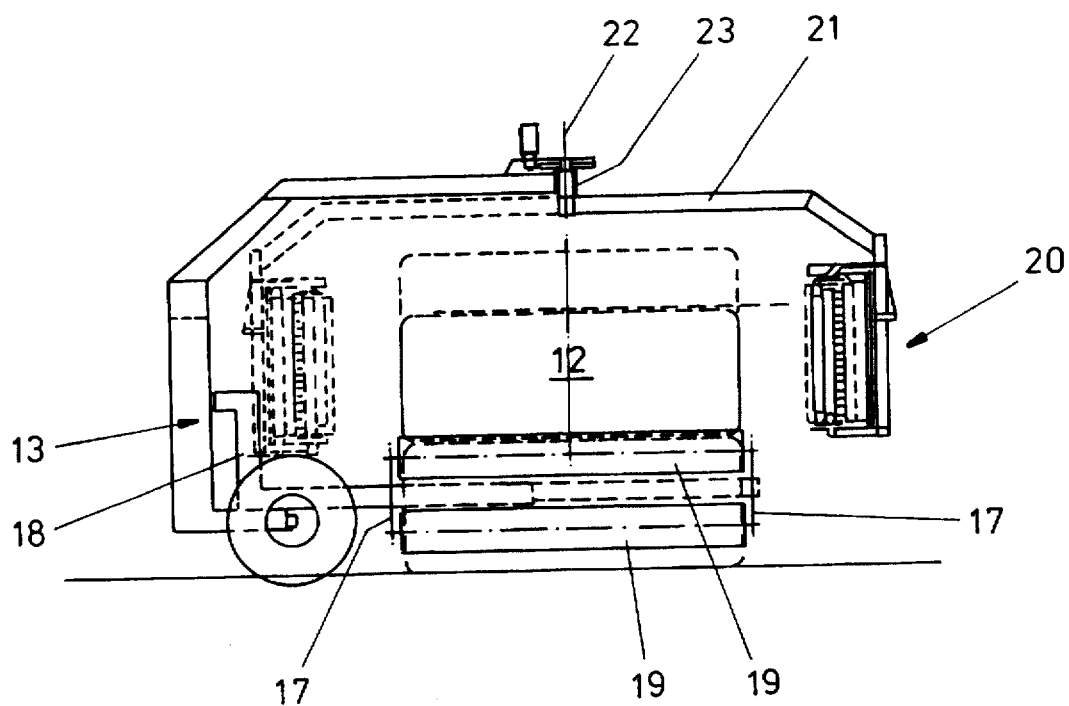
FIG. 2 is a side view of the apparatus shown in FIG. 1.
Figure 3:
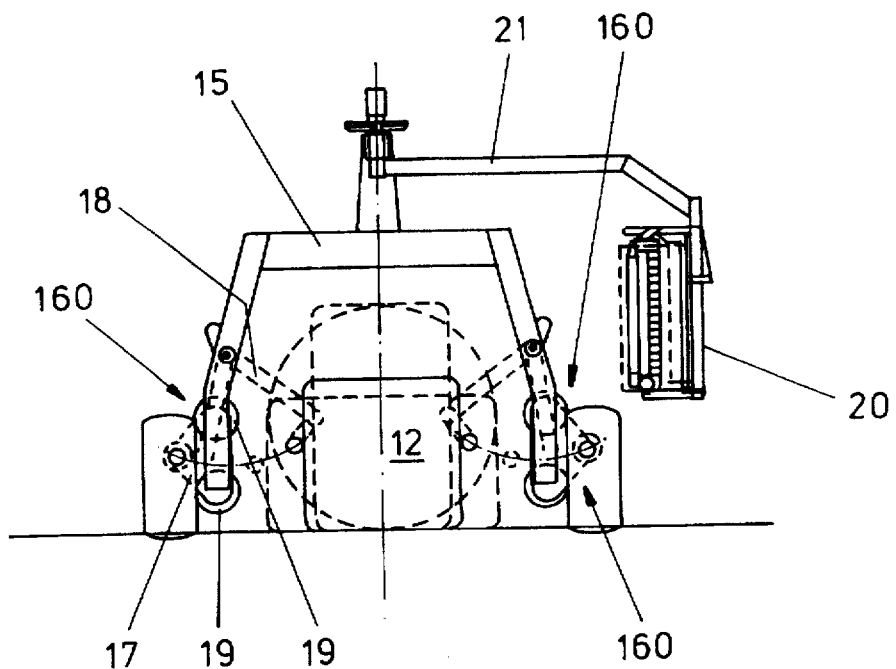
FIG. 3 is an end view of the apparatus shown in FIGS. 1 and 2.

Referring first to FIGS. 1 to 3 of the drawings, there is shown a first embodiment of bale wrapper apparatus according to the invention which is designated generally by reference 10 and which is being towed in the direction of arrow X in FIG. 1 behind a propelling vehicle in the form of tractor 11 in a laterally off-set position so that the tractor 11 can run alongside a line of bales deposited in a field, of which one is shown by dotted outline 12. It can be seen from FIG. 3 that the apparatus 10 is readily lined-up with the bale 12, and is able to receive the bale, lift it, apply stretchable plastics film wrapping around it, and then rearwardly discharge the wrapped bale during forward movement of the tractor 11 and apparatus 10 towards the next bale in the row.

The apparatus 10 comprises a frame designated generally by reference 13, coupling means in the form of a tow bar 14 attached to and projecting forwardly of the frame 13 to enable the apparatus 10 to be towed behind the tractor 11, and an arch structure 15 which forms part of the frame 13 and which faces in the intended direction of travel and which is of sufficient size to allow bale 12 lying on the ground to pass through the arch 15 when the apparatus 10 is moved forwardly.

In the illustrated embodiment, the arch 15 is located at the rear end of the frame 13 of the apparatus, and therefore it will be the wrapped bale which is discharged through the arch 15 after completion of the wrapping operation. FIG. 3 is a rear view of the apparatus, and shows how different shapes of bale 12 can be readily received by the apparatus on a through-flow basis, with bale 12 being shown taking up a number of different rectangular cross section shapes, and also a cylindrical shape.

A 2-part bale lifting cradle designated generally by reference 160 (see FIG. 3) is mounted on the frame 13 and is operative to lift the bale 12, after it has been received by the apparatus, to take-up a raised bale-wrapping position. The lifting cradle 160 comprises a pair of lifting roller assemblies 16 (see FIG. 1) laterally spaced from each other, as shown in FIG. 3, to allow bale 12 to be received between them, and each assembly 16 is operative to engage at least an adjacent side and/or underside of the bale 12 and to lift the bale to the bale-wrapping position. In the case of a rectangular cross section bale, each lifting assembly 16 will be engageable with the adjacent substantially vertical opposed side of the bale. Each lifting assembly 16 comprises mounting plates 17 pivotally mounted on the end of a support arm 18, and which can be pivoted inwardly and outwardly via the arm 18 between positions of different spacings apart from each other of the assemblies 16 to allow different widths of bale to be handled. Each pair of plates 17 carries two rollers 19 which extend generally parallel to the direction of travel, and which occupy a bale-lifting position as shown in FIG. 3 in which one roller 19 is above the other, and upon the application of drive to the rollers, the bale can be lifted by frictional contact between the rollers and the sides of the bale.

Figure 6:
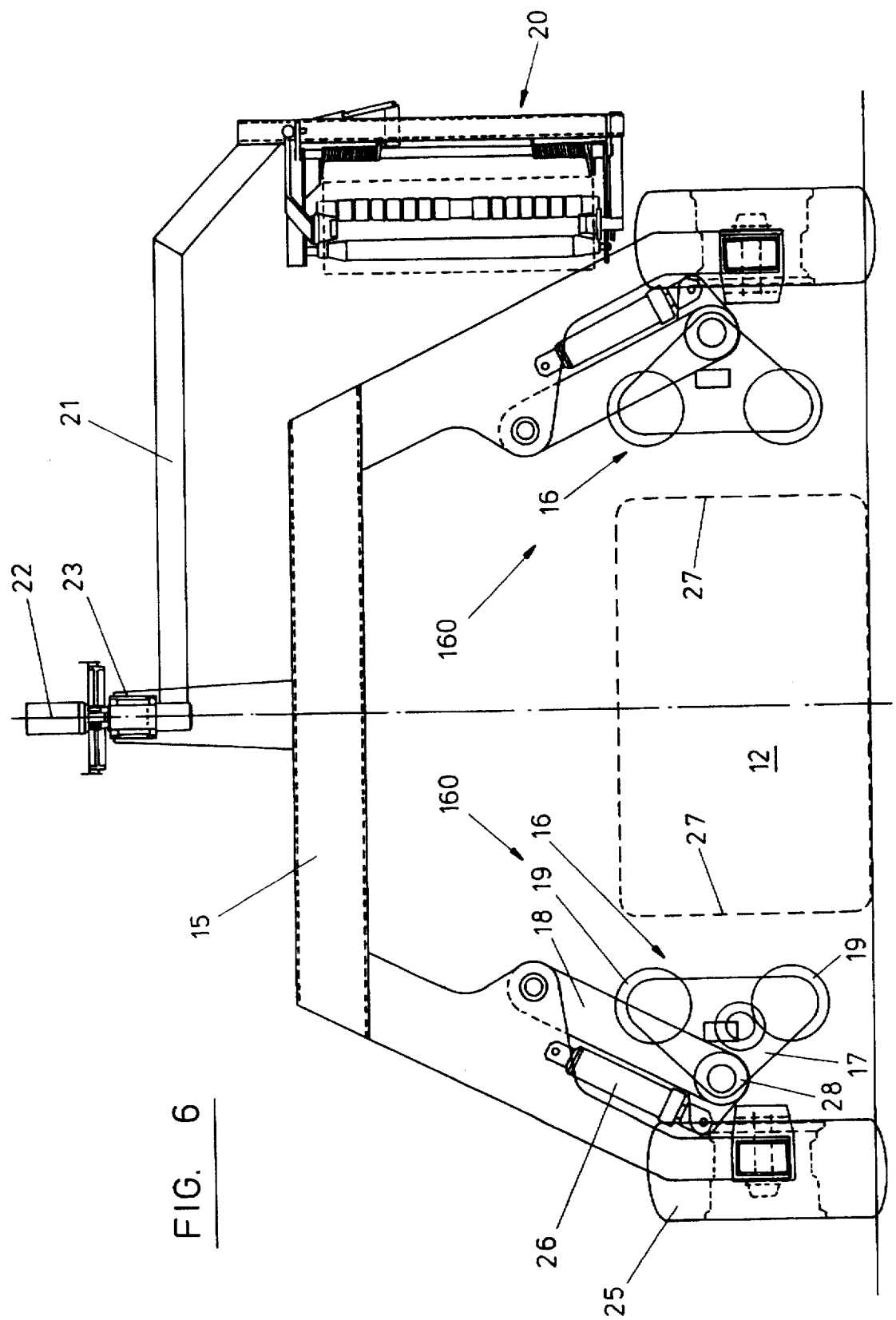
FIG. 6 is a rear view of the apparatus showing a bale lifting device in an inoperative position prior to engagement with a bale lying on the ground.
Figure 7:
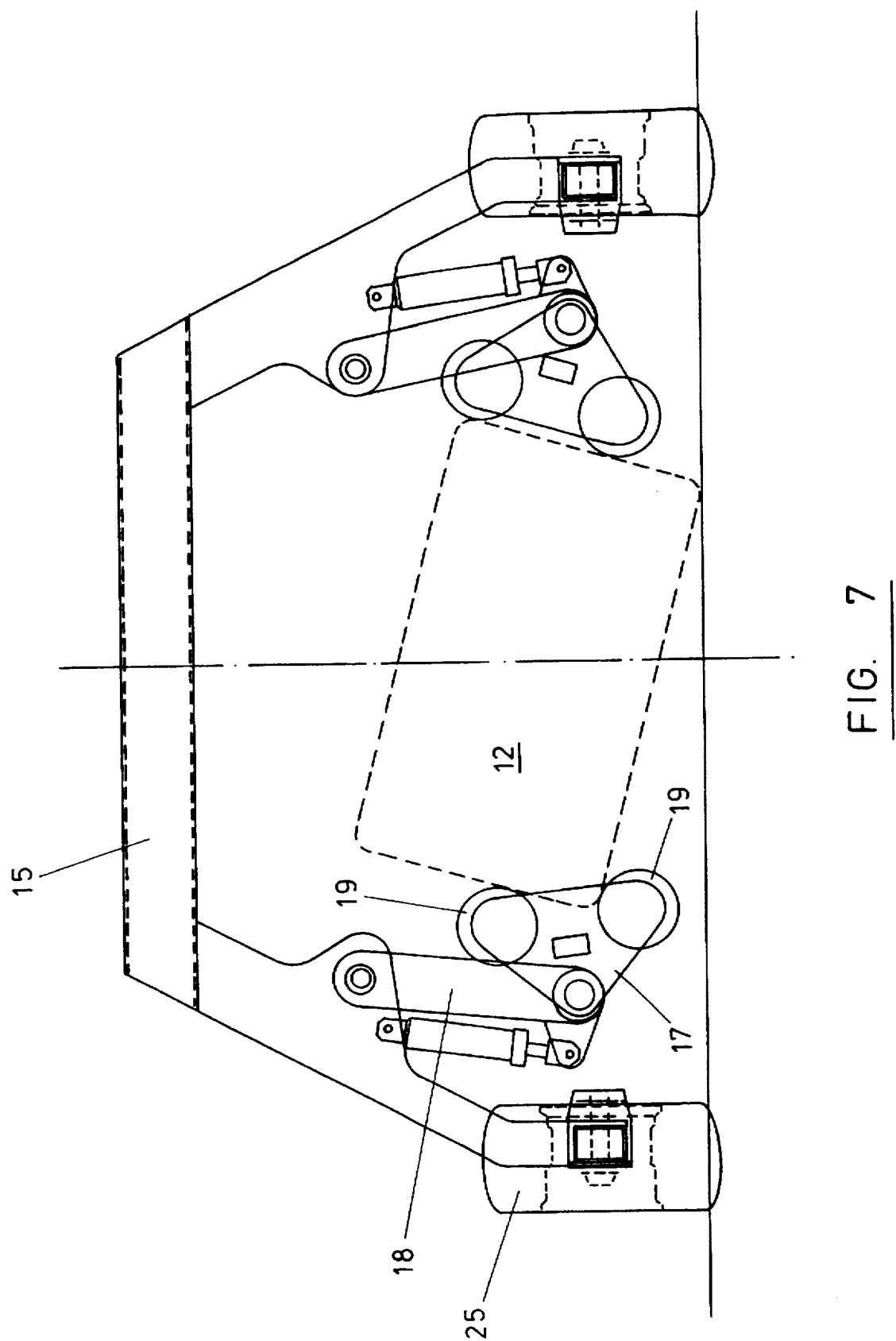
FIG. 7 is a view, similar to FIG. 6, showing an initial stage in a bale-lifting operation.
Figure 8:
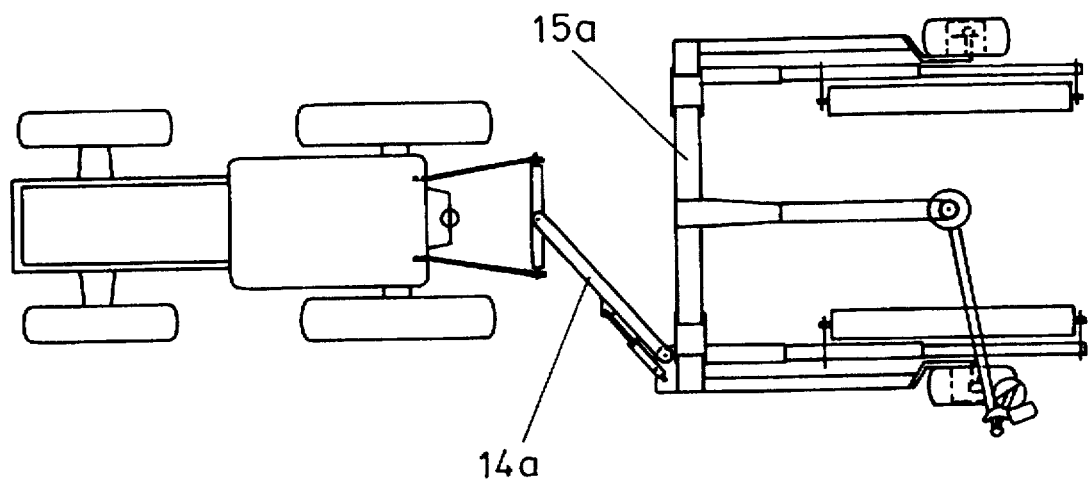
FIG. 8 is a plan view of a third embodiment of bale wrapper apparatus, illustrated occupying a transport position directly behind a tractor.
Figure 9:
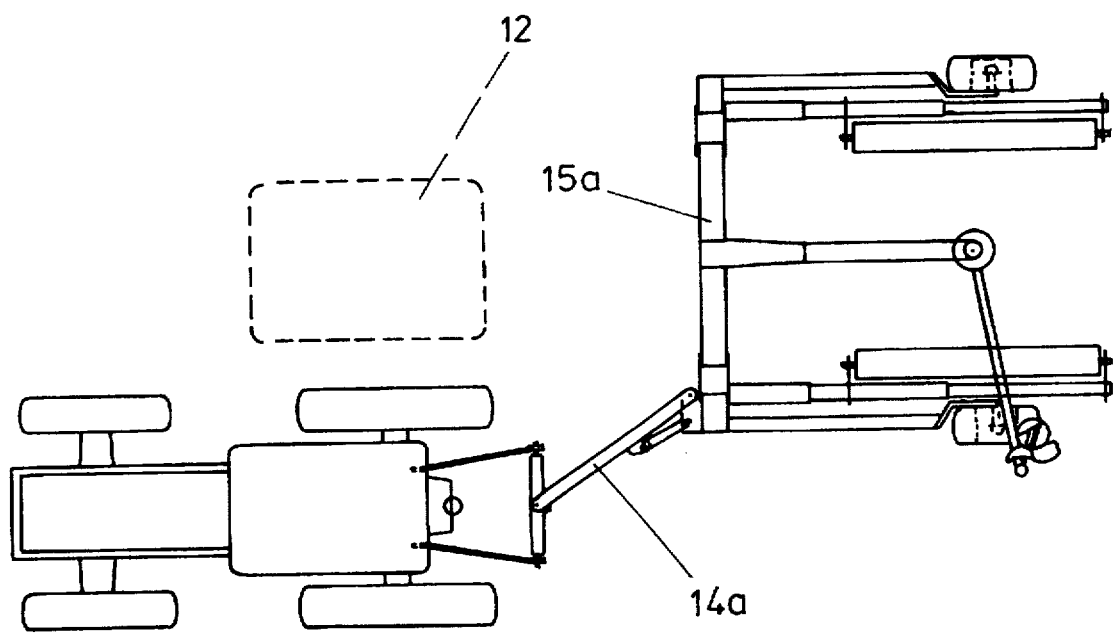
FIG. 9 is a plan view, similar to FIG. 8, but showing the apparatus of FIG. 8 laterally off-set to a bale handling and wrapping position.

FIG. 6 is an enlarged view of the roller assemblies and associated components, and FIG. 7 is a similar view showing an initial stage in the lifting operation.

As will be described in more detail with reference to the subsequent figures of drawings, the bale lifting assemblies 16 are also capable of constituting means for rotating the bale about a substantially horizontal axis which extends generally parallel to the direction of travel after the bale has been lifted to the bale-wrapping position, and this rotation of the bale, in conjunction with the provision of means to effect relative rotation between a film supply reel and the bale about a substantially vertical axis enables film to be withdrawn from the reel to apply successive overlapping windings to the bale in order to wrap it. In the illustrated embodiment, the supply reel support unit, designated by reference 20, is mounted on the end of a rotary support arm 21 which is rotatable about substantially vertical axis 22 via a rotary mounting 23 at its inboard end, whereby the unit 20 can be caused to carry out a circular orbital path of movement around the bale 12 while the latter is being rotated about generally horizontal axis 24.

However, it is not essential for the reel support unit 20 to move along a circular path, and there may be situations in which it is more preferable for the unit to move along a closed path or loop which is non-circular e.g. elliptical, in which case the unit 20 may be arranged to carry out angular movement about more than one vertical axis.

The frame 13 of the apparatus is supported by a set of rear wheels 25, and can be pulled forwardly in the off-set position shown in FIG. 1, in order to carry out handling, wrapping and discharge of the bale 12, but apparatus 10 can be pivoted to a transport position directly behind the tractor 11. Only a single support unit 20 for a film dispenser reel is shown in FIGS. 1 to 3, and this support unit may be of any known types currently in use of "satellite" type film dispenser arrangements. The support unit 20 may incorporate any suitable pre-stretcher mechanism e.g. of the type disclosed in EP 0291483. However, if desired, a double arm may be provided, having support unit 20 at each end, so that double film wrapping can take place simultaneously. Alternatively, a further support arm and respective film reel support unit may be provided.

Figure 13:
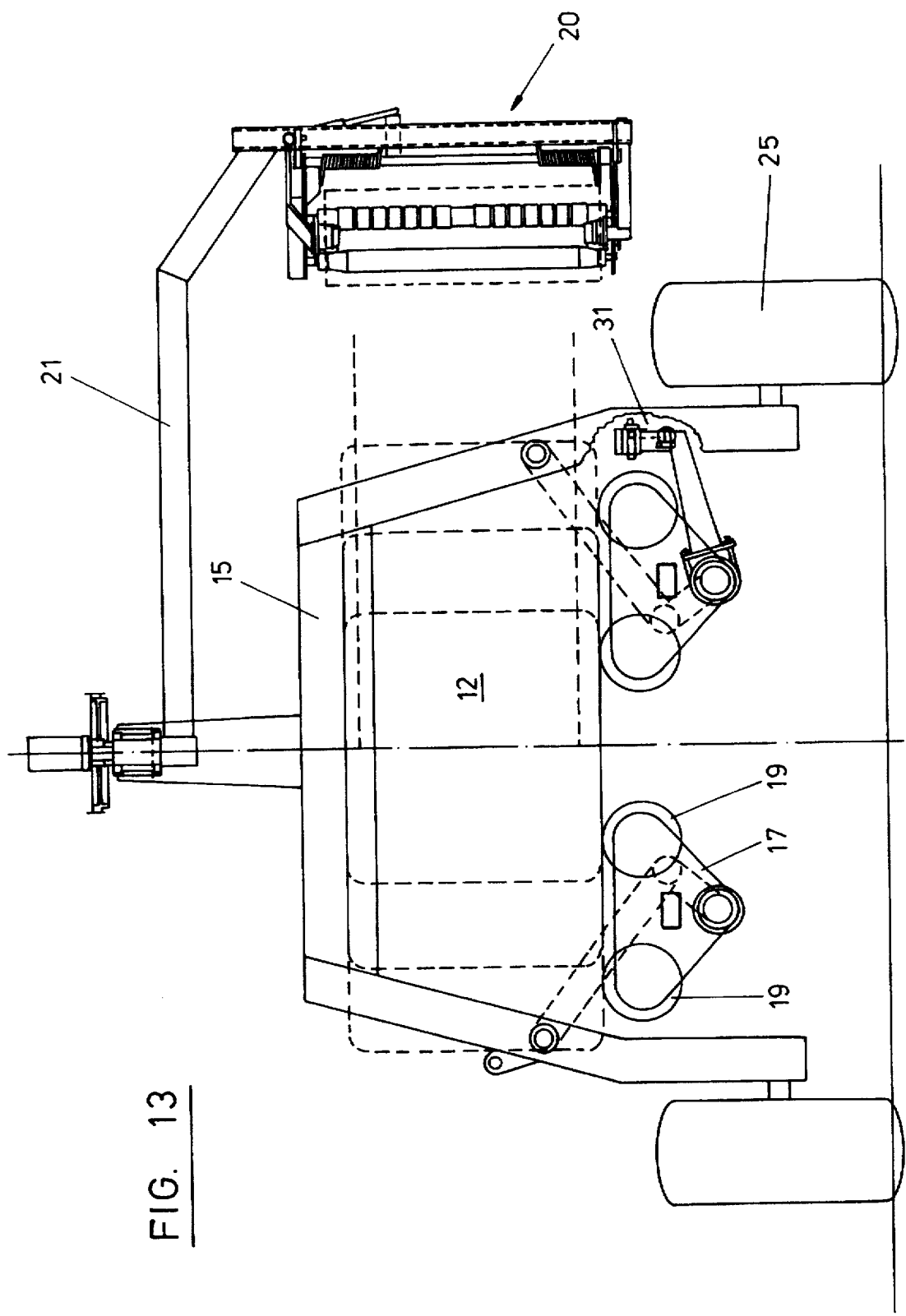
FIG. 13 is a view, similar to FIG. 12, showing the bale lifter device acting on the lifted bale and ready to carry out driving rotation of the bale during wrapping.

FIG. 6 shows the two lifting roller assemblies 16 of cradle 160 pivoted to the most extreme laterally separated position, but they can be moved towards each other under the action of a ram 26 until the rollers 19 come into engagement with the opposed substantially vertical sides 27 of bale 12, ready to carry out a bale-lifting operation. The rollers 19 of the left hand assembly 17 will both be rotated in anti-clockwise direction, whereas the rollers 19 of the right hand assembly will be rotated in a clockwise direction to lift the bale. Once the rollers 19 have raised the bale 12 to the bale-wrapping position, the assemblies 16 can be caused to pivot about the pivots 28 at the lower end of arms 18 until they take-up a position shown in FIG. 13, ready to apply rotary movement to the bale 12 about generally horizontal axis 24. When they have reached this position, all of the rollers 19 will be driven in the same direction which will be clockwise in order to rotate the bale in an anti-clockwise direction.

The driving of the rollers 19, and their direction of rotation may be programmed into an automatic control system which controls the operation of the bale wrapper.

FIGS. 8 to 11 show a second embodiment of bale wrapper apparatus according to the invention, and of which one of the major differences is that arch structure 15a is provided at the front or entrance end of the apparatus, so that bale 12 must first pass through arch structure 15a before being engaged, lifted, wrapped and then rearwardly discharged from the apparatus. Unimpeded access to through-flow travel of the bale 12 is provided in this embodiment also, in that after wrapping is completed, the bale can easily be discharged rearwardly of the apparatus also.

Description will now be made of a film clamp/cutting means which may be provided, in order to gather the film into a "string", clamp the gathered film and then cut it, so that the wrapped bale can then be discharged. This film gathering, clamping and cutting operation takes place on the length of film running between the supply reel and the wrapped bale, and to enable this to take place, it will usually be preferable for the satellite carrying arm 21 to be moved to a position-as shown in FIG. 14, in which it extends transversely of the direction of forward motion, and nearly at right angles thereto. The mechanism which operates on the length of film may be arranged to be manually triggered into operation, or automatically actuated under an automatic bale wrapping programme as required. The mechanism, regardless of how it is triggered or actuated e.g. operated automatically or manually under driver control, operates to gather the length of film shown by dotted outline 30 in FIG. 14 between supply reel 29 and the wrapped bale 12a, and then clamps the gathered film, cuts the film thereby allowing the wrapped bale 12a to be rearwardly discharged by disengagement of the rollers 19 from any supporting function therefore, and holding the cut end of the film after the wrapped bale has been discharged ready for a further cycle of operation.

After a new bale has been received and then made ready for a bale wrapping operation, the satellite arm 21 is then caused to orbit about axis 22 simultaneously with rotation of the bale about axis 24, and the reel 29 can be caused to orbit through at least one revolution e.g. one and a half revolutions, before the held end of film is released by the mechanism. By this time there will be sufficient adhesion of film around the outer periphery of the bale that continued rotation of the reel 29 will allow film to be drawn from it under tension and then applied as further windings around the bale until wrapping is completed.

Figure 12:
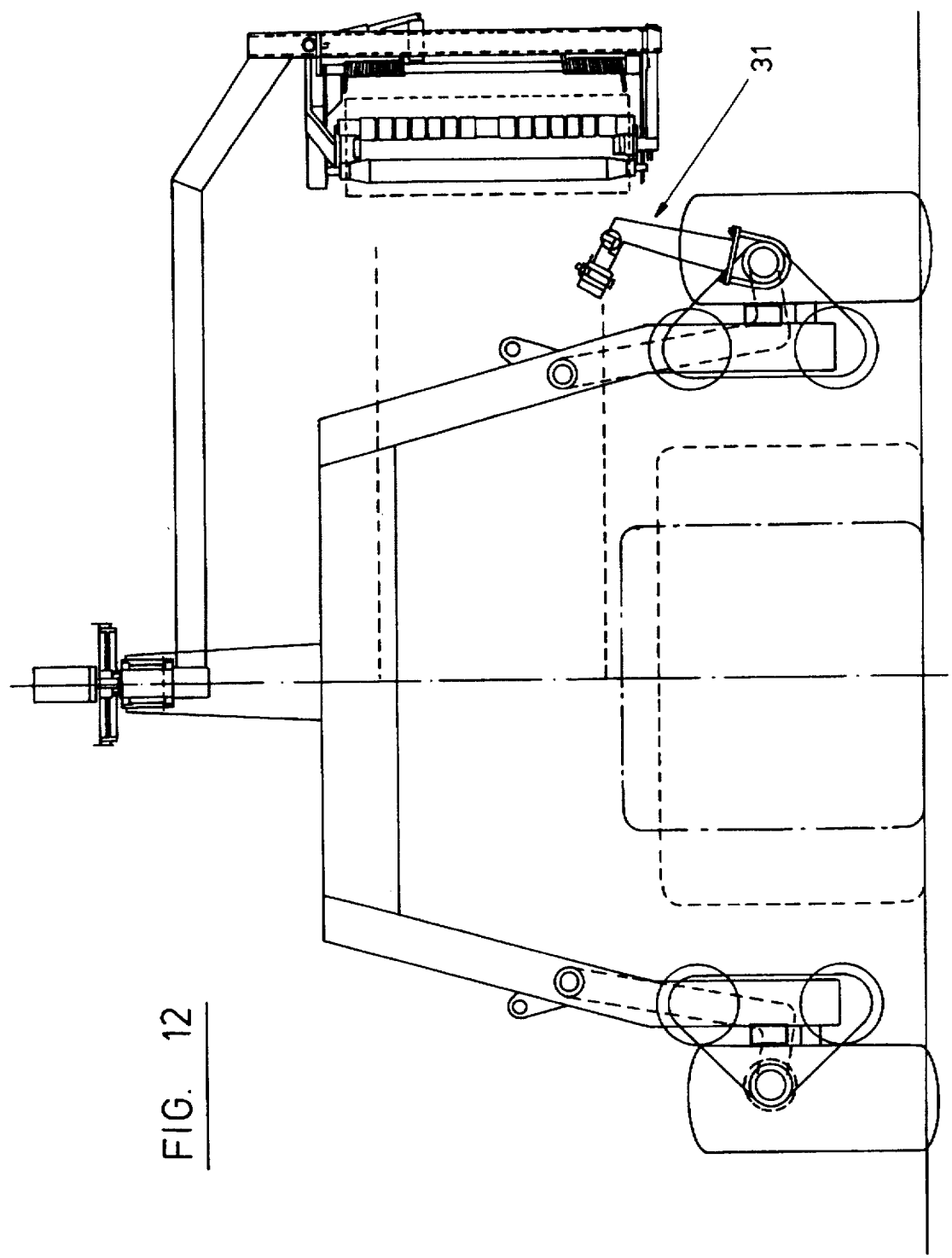
FIG. 12 is a rear view of a further embodiment with the bale lifting device in an inoperative position.

The mechanism which is operated to carry out film gathering, clamping and cutting is designated generally by reference 31 (see FIGS. 12 and 13), and which comprises a longitudinally extensible arm 32 which can be first pivoted upwardly from a horizontal position, as shown in FIG. 15, so that once extended, the arm 32 can bear downwardly on the upper horizontal edge 33 of film length 30.

Figure 4:
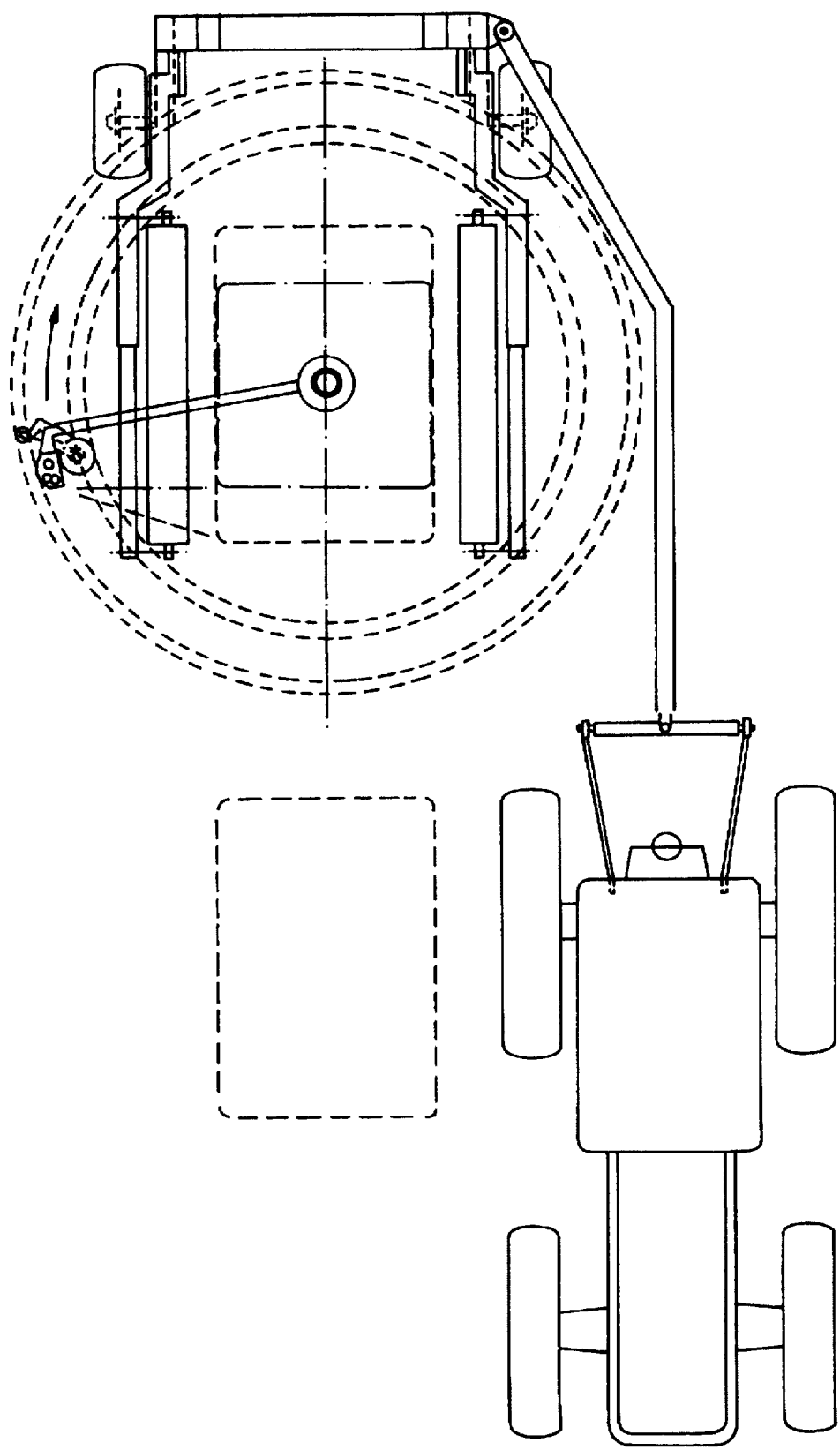
FIG. 4 is a plan view, similar to FIG. 1, showing a second embodiment of apparatus.
Figure 5:
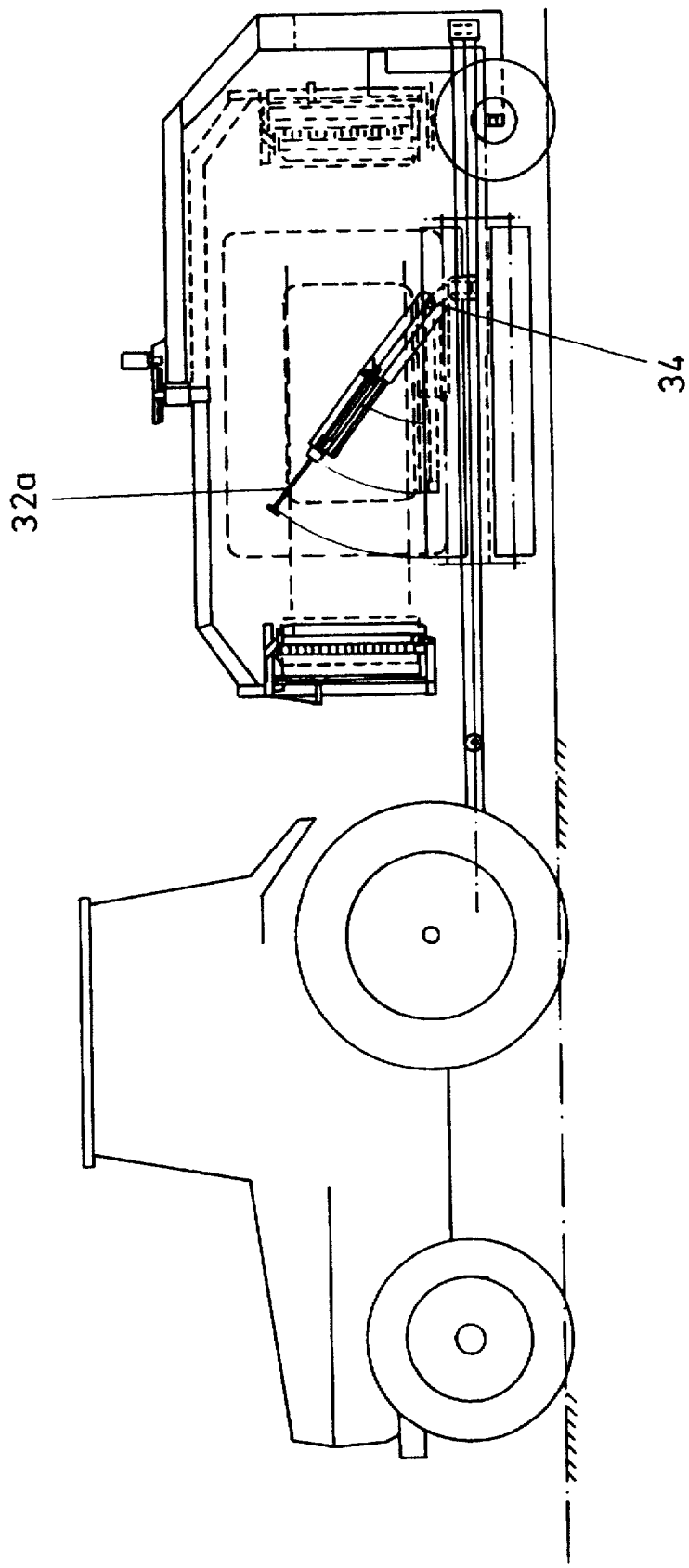
FIG. 5 is a side view of the apparatus shown in FIG. 4.
Figure 10:
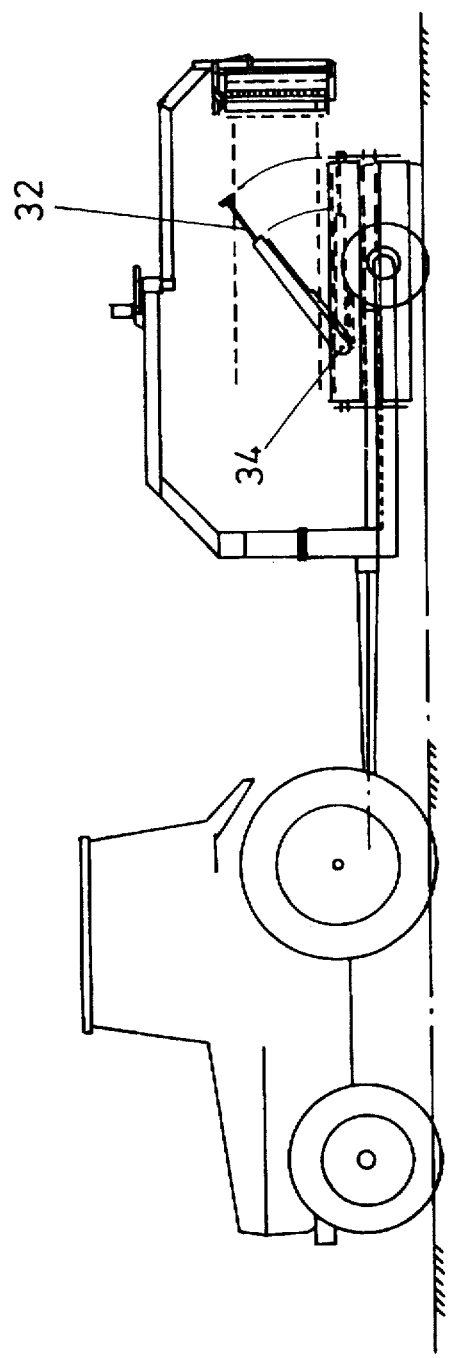
FIG. 10 is a side view of the apparatus shown in FIGS. 8 and 9.
Figure 11:
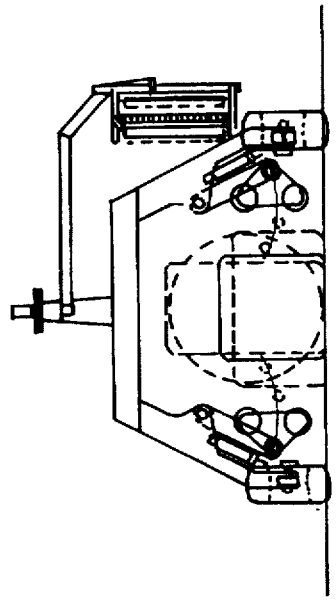
FIG. 11 is a rear view of the apparatus shown in FIGS. 8 to 10.

FIG. 10 shows an arrangement of arm 32 similar to that shown in FIG. 15, whereas the embodiment of FIGS. 4 and 5 shows an alternative arrangement in which arm 32a extends forwardly of a pivotable mounting 34 on the frame, but which otherwise operates in generally similar manner.

FIG. 15 shows the arm 32 in the fully extended position, and to which it is moved under the action of a ram 35 and it can be maintained in this position by spring 36 pressing into a detent groove 37. A clamp head 38 is arranged on the end of arm 32, and its path of travel is shown by curved path 39, and during downward movement of arm 32 the underside of the arm engages the upper edge 33 of the film length 30 and compresses it into a "string". Although not shown, an anvil or other reaction member may be arranged fixedly on the apparatus in line with the direction of the film length 30, and against which the film length can be compressed into the gathered form. The clamp head 38 is then withdrawn rapidly to clamp the gathered film against a further clamp plate 40 which clamps the film, and then a blade or other cutter (not shown in detail) cuts the film between the clamping of the film and the wrapped bale, so that the wrapped bale can then be rearwardly discharged from the apparatus upon forward, or further forward movement of the apparatus. The film length now running from the supply reel to the clamps 38, 40 is then held, and upon completion of at least one revolution of the supply reel 29 during wrapping operation in a new cycle on a further bale, the clamps can then be released and the wrapping operation continued as described above.

The discharge of the wrapped bale can take place by removal of engagement of the rollers 19 from the bale, which then allows the bale to fall under gravity onto the ground, and to move rearwardly by relative motion on forward movement of the apparatus.

If it should be desired to provide controlled lowering of the wrapped bale, the roller assemblies 16 of cradle 160 could be returned to the position in which the rollers 19 of each assembly are located one above the other, and could be pressed against the sides (27) of the wrapped bale. The rollers 19 could then act as (idle) braking rollers driven by the downward movement of the wrapped bale under gravity. Alternatively, the rollers 19 could be driven at slow speed in order to lower the wrapped bale to the ground.

Alternatively, though not shown, the assemblies in which the rollers 19 are mounted could be further pivotably mounted in such a way that the rollers 19 could incline downwardly and rearwardly, thereby to allow the wrapped bale to slide axially of the rollers and in a rearward direction.

The bale wrapper apparatus has been shown in the drawings towed behind a tractor, and in a laterally off-set position in order to pick-up, wrap and then discharge the bales. Although not shown, the apparatus could be front-mounted to a propelling vehicle, in laterally off-set manner via a suitable coupling arrangement. In addition, the apparatus could be operated directly following another piece of equipment e.g. a rectangular baler, in which case it will not be laterally off-set in order to carry out a lifting, wrapping and discharge operation on a bale received from the baler.

The drawings show preferred embodiments of mobile bale wrapper apparatus capable of engaging a bale lying on the ground in the path of travel of the apparatus, and operative (1) to pick-up the bale, (2) to wrap the bale with stretchable plastics film wrapping and (3) to discharge the wrapped bale wrapped bale from the apparatus, and comprising: a frame 13, and a bale-lifter cradle 160 mounted on the frame and operative to lift the bale to the bale wrapping position, in which the cradle comprises a pair of elongate lifting devices 16 laterally spaced from each other with respect to the path of travel X, and extending in the direction of the path of travel, these two devices 16 being engageable with opposed sides of the bale to lift the bale to the bale wrapping position.

To allow free movement of the bale on the ground into engagement with the lifting devices 16, the construction of the cradle 160 and of the frame 13 is arranged in such a way that the bale lying on the ground can be received by the lifting device as the apparatus is moved forwardly along its path of travel and without any obstruction by the frame. This may be achieved by providing the arch structure 15, which is mounted at the front, or an intermediate position along the length of the cradle.

In addition, as shown in the drawing, the arch structure (15) may be arranged at the rearward end of the cradle 160, and in this case it is of such a shape and size as to allow rearward discharge of the wrapped bale from the cradle by passing freely through the arch.

Although not shown, the arch structure (15) may form part of a tunnel-like enclosure overlying the cradle, which allows entry of the bale on the ground into the cradle, and the sequence of operations to lift, wrap and then rearwardly discharge the bale, all without obstruction by any component parts of the frame structure.

With regard to the lifting roller assemblies of the cradle (16, 17, 38, 19), the provision of the two rollers 19 in each lifting assembly is a preferred arrangement, which is particularly suitable for handling awkward shapes of bale, namely bales of rectangular or square cross section. These rollers are also particularly suitable for handling bales of circular cross section.

However, although not shown, each lifting roller assembly may be provided with a single roller, which will be well able to engage the underside of a circular cross section bale, lift the bale to a bale wrapping position, and then drive the bale to rotate about a substantially horizontal axis generally coinciding with the longitudinal axis of the circular section bale.

The single roller assemblies may be arranged such that they can move laterally relative to each other i.e. one or both assembly moving laterally, and when they move laterally towards each other, they can engage and then lift a bale off the ground to the bale wrapping position. At least one of the rollers may be driven then in order to rotate the bale about its longitudinal axis.

Alternatively, the single rollers of the two lifting assemblies may be raised and lowered as a unit e.g. by hydraulic means, operating in the manner of a fork-lift, to raise and lower the bale.

Also, although not shown, the apparatus may be used to pick-up, wrap, and then discharge two bales together, which may be rectangular or circular cross-section bales. A pair of bales may be received one behind the other on the cradle, to be wrapped together and then discharged as a single wrapped package. Alternatively, a pair of bales may be stacked one above the other, and then received by the cradle for joint wrapping and discharge as a single wrapped package.

The "cradle" type of twin roller arrangement which engages at each side of the bale (as disclosed herein and shown in the drawings by references 16, 160 and 19) is particularly suitable for: (1) picking up a bale lying on the ground and raising the bale to a bale-wrapping position with the rollers in each cradle arranged one above the other and followed by; (2) pivoting of each cradle to align the rollers horizontally and below the lower surface of the bale; and (3) applying a tumbling type of rotary action to the bale to rotate it about a generally horizontal axis while wrapping takes place.

The twin roller arrangement of each cradle is particularly effective in all three phases of which operation as referred to above, and especially in the third phase, in which the corner edges of the bale (the longitudinally extending corner edges in the case of a rectangular cross section bale) can fall into the gap between each pair of rollers as it is driven into a "tumbling" type of rotary movement. (An edge of the bale tends to form an instantaneous centre of rotation of the entire bale when the edge becomes temporarily located between each pair of rollers of each cradle).

For certain shapes and/or types of bale, it may be desirable to increase the area of gripping contact which can be achieved with the side faces of the bale, by providing an arrangement of endless belts (not shown) which are taken around the pair of rollers in each cradle, and which belts are driven by at least one of the rollers. Preferably, the belts are "slack" belts which can define a trough shape between each pair of rollers, and in which trough the bale edges can be received to assist the rotation of the bale.

We claim:

1. A mobile bale wrapper apparatus which is capable of engaging a bale lying on the ground in the path of travel of the apparatus and which is operative (i) to pickup the bale, (ii) to wrap the bale with stretchable plastics film wrapping and (iii) to discharge the wrapped bale from the apparatus, and which comprises:

a frame;

an arch structure forming part of said frame and which faces in the direction of the intended path of travel of the apparatus, said arch structure being downwardly open and of such a size and shape as to allow a bale lying on the ground to pass freely through the arch structure upon forward movement of the apparatus;

a bale-lifting cradle mounted on the frame and operative to receive and to lift a bale lying on the ground to a bale-wrapping position, said cradle comprising a pair of elongate lifting devices laterally spaced apart from each other with respect to the path of travel and engageable with opposed sides of the bale to lift the bale to the bale-wrapping position;

means for rotating the bale about a substantially horizontal axis extending generally parallel to the path of travel when the bale has been lifted to the bale-wrapping position;

means for holding a supply reel of stretchable plastics film for wrapping the bale;

means for causing relative angular movement between the supply reel and the bale about at least one substantially vertical axis, while the bale is being rotated about said substantially horizontal axis, whereby film can be withdrawn from the reel to apply successive overlapping windings to the bale in order to wrap the latter; and, means operative to discharge the wrapped bale from the apparatus.

2. A mobile bale wrapper apparatus which comprises:

a frame;

coupling means attached to the frame and operative to couple the apparatus in laterally off-set manner to a propelling vehicle whereby the propelling vehicle can run alongside a line of bales lying on the ground while the apparatus moves along its laterally off-set path of travel in which (i) it can pick-up each bale in turn, (ii) wrap the bale with stretchable plastics film wrapping and (iii) discharge the wrapped bale from the apparatus;

a bale-lifting cradle mounted on the frame and operative to receive and to lift a bale lying on the ground to a bale-wrapping position, said cradle comprising a pair of elongate lifting devices laterally spaced apart from each other with respect to the path of travel and engageable with opposed sides of the bale to lift the bale to the bale-wrapping position;

means for rotating the bale about a substantially horizontal axis extending generally parallel to the path of travel when the bale has been lifted to the bale-wrapping position;

means for holding a supply reel of stretchable plastics film for wrapping the bale;

means for causing relative angular movement between the supply reel and the bale about at least one substantially vertical axis, while the bale is being rotated about said substantially horizontal axis, whereby film can be withdrawn from the reel to apply successive overlapping windings to the bale in order to wrap the latter;

means operative to discharge the wrapped bale from the apparatus; and an arch structure which forms part of said frame and which faces in the direction of the intended path of travel of the apparatus, said arch structure being downwardly open and of such a size and shape as to allow the wrapped bale to be discharged rearwardly through the arch structure.

3. Apparatus according to claim 1, in which the arch structure is positioned at the forward end of the cradle.

4. Apparatus according to claim 1, in which the arch structure is positioned intermediate the forward and rearward ends of the cradle.

5. A bale wrapper apparatus according to claim 1, including a towbar attached to and projecting forwardly of the frame to enable the apparatus to be towed behind a propelling vehicle.

6. Apparatus according to claim 5, in which the towbar is arranged to be capable of being coupled to the rear of the propelling vehicle, and is adjustable so that the apparatus can move between a laterally off-set position relative to the propelling vehicle to carry out bale-wrapping, and a transport position directly behind the propelling vehicle.

7. Apparatus according to claim 1, in which a support unit for mounting the supply reel is carried on the end of an arm which is rotatably mounted on the frame to rotate about a substantially vertical axis whereby the supply reel is able to carry out a circular orbit around the bale.

8. Apparatus according to claim 7, in which two support units are provided, each adapted to carry a respective supply reel, and each mounted on a respective rotatable arm.

9. Apparatus according to claim 1, in which the lifting cradle comprises a pair of lifting roller assemblies laterally spaced from each other to allow a bale to be received therebetween, and each operative to engage one side and the underside of the bale and to lift the bale to the bale-wrapping position.

10. Apparatus according to claim 9, in which each lifting roller assembly comprises two rollers which extend generally parallel to the direction of travel and which can be driven in order to lift the bale to the bale-wrapping position by frictional contact between the rollers and the bale sides.

11. Apparatus according to claim 10, in which each lifting roller assembly is capable of taking-up a bale-engaging position in which the rollers are arranged one above the other, so that the rollers can engage the adjacent substantially vertical sides of a rectangular bale to lift the latter to the wrapping position.

12. Apparatus according to claim 11, in which each lifting roller assembly is pivotable from the bale-engaging position to a bale driving position in which the rollers move to a position at approximately the same level to support the lower side of the bale.

13. Apparatus according to claim 12, including means for driving the rollers in the same direction as each other in order to impart rotation to the bale about the substantially horizontal axis.

14. Apparatus according to claim 10, including means for adjusting the lateral separation between the two lifting roller assemblies to suit different transverse dimensions of bales to be received therebetween.

15. Apparatus according to claim 1, including a film gathering, clamping and cutting device which is operative in order to gather the length of film running between the supply reel and the wrapped bale to form a gathered film string; to clamp the gathered film via clamps; to cut the film between the clamps and the wrapped bale; and to hold the cut end after the wrapped bale has been discharged ready for a further cycle of operation.

16. Apparatus according to claim 15, in which the mechanism includes an extendible actuator arm which can be pivoted upwardly about a pivot mounting so that it can overlie the upper edge of the length of film running between the wrapped bale and the supply reel, and subsequently can be moved downwardly to engage the upper edge and compress the film into a gathered film string prior to clamping and cutting of the film.

17. Apparatus according to claim 16, including a rotatable arm carrying the film reel support and which is arranged to reach a final position extending transversely of the intended direction of travel once wrapping is completed, and prior to operation of the mechanism.

18. Apparatus according to claim 9 and adapted for use in wrapping a bale of generally circular cross section, in which each lifting roller assembly includes a respective single roller which extends generally parallel to the path of travel.

19. Apparatus according to claim 18, in which the rollers of the two lifting roller assemblies are relatively movable laterally towards each other in order to engage and to lift a bale lying on the ground to the bale-wrapping position.

20. Apparatus according to claim 18, in which the rollers of the two lifting roller assemblies are movable upwardly as a unit, after engagement with the underside of a bale lying on the ground, in order to raise the bale to the bale-wrapping position.

21. Apparatus according to claim 19, in which at least one of the rollers of the two lifting roller assemblies can be driven in order to rotate the circular cross section bale.

22. A bale wrapper apparatus for applying stretchable plastics film windings around a bale of rectangular cross section in order to wrap the bale, in which the apparatus comprises:

a frame;

a towbar attached to and projecting forwardly of the frame to enable the apparatus to be towed behind a propelling vehicle;

an arch structure forming part of said frame and facing in the intended direction of travel, said structure being of sufficient size to allow a bale lying on the ground to pass through the arch when the apparatus is moved forwardly;

a bale lifting device mounted on the frame and operative to lift a bale lying on the ground to a bale-wrapping position;

means for rotating the bale about a substantially horizontal axis extending generally parallel to the direction of travel when the bale has been lifted to the bale wrapping position;

a rotatable arm adapted to carry a supply reel of stretchable plastics film and mounted on the frame to rotate about a substantially vertical axis and thereby cause the reel to carry out a circular orbit around the bale while the latter is rotated about the substantially horizontal axis and thereby apply overlapping windings of film around the outer surface of the bale;

in which the bale-lifting device comprises:

a pair of lifting assemblies mounted on the frame at laterally spaced apart positions to allow the rectangular cross section bale to be received therebetween with two opposed sides of the bale extending substantially vertically;

a pair of rollers rotatably mounted in each assembly and extending in a direction parallel to the direction of travel and defining a clear entry path for the bale to be received between the rollers of the two assemblies;

pivotable mountings supporting each assembly and allowing each assembly to occupy an engaging position in which the rollers of each assembly are located one above the other and able to engage the adjacent side of the bale, and when drive is applied to the rollers to cause the bale to be lifted from the ground under frictional contact with the sides of the bale and then take-up a bale-wrapping position, and said assemblies also being able to take-up a bale supporting and driving position in which the rollers of each assembly are located side by side and supporting the underside of the bale and being operative when drive is applied to all of the rollers to cause the bale to rotate about said substantially horizontal axis extending parallel to the direction of travel and thereby form said bale rotating means; and, means for laterally separating the assemblies from the bale when wrapping has been completed, whereby the wrapped bale can fall under gravity onto the ground and then be discharged rearwardly relative to the apparatus when the latter is moved forwardly by the propelling vehicle.

23. Apparatus according to claim 10, including endless belts taken around the rollers of each lifting assembly.

* * * * *